United States Patent [19]

Miller

[11] Patent Number: 4,932,829
[45] Date of Patent: Jun. 12, 1990

[54] ARTICULATED MOTORCYCLE CARRIER

[76] Inventor: Robert W. Miller, 15946 Marriner Dr., Huntington Beach, Calif. 92649

[21] Appl. No.: 281,405

[22] Filed: Dec. 8, 1988

Related U.S. Application Data

[63] Continuation-in-part of Ser. No. 72,630, Jul. 13, 1987, Pat. No. 4,790,713.

[51] Int. Cl.$^5$ .................. B60P 3/07; B65G 67/02
[52] U.S. Cl. ...................... 414/462; 298/14; 414/480; 414/537
[58] Field of Search .............. 224/42.08, 42.32, 310, 224/319; 298/1 A, 12, 14; 414/462, 480, 537

[56] References Cited

U.S. PATENT DOCUMENTS

| | | | |
|---|---|---|---|
| 4,087,014 | 5/1978 | Schadle | 414/462 |
| 4,212,580 | 7/1980 | Fluck | 298/1 A X |
| 4,655,671 | 4/1987 | Pratt | 414/480 X |
| 4,749,317 | 6/1988 | Daniel | 414/462 X |

FOREIGN PATENT DOCUMENTS 2271068  1/1976  France ...................... 414/480

Primary Examiner—David A. Bucci
Assistant Examiner—Janice Krizek
Attorney, Agent, or Firm—I. Michael Bak-Boychuk

[57] ABSTRACT

A motorcycle carrier conformed for pivotal engagement to the bed of a truck includes a pivotal channel in which a motorcycle carrying track is translated on rollers. A strap passing over pulleys then allows pivotal motion of the member from the truck bed and concurrent translation of the track, raising the member to a vertical position, and deploying the track onto the ground for loading or unloading. Once the loading function is effected the member and the track advanced thereon may be returned onto the truck bed for transport.

4 Claims, 4 Drawing Sheets

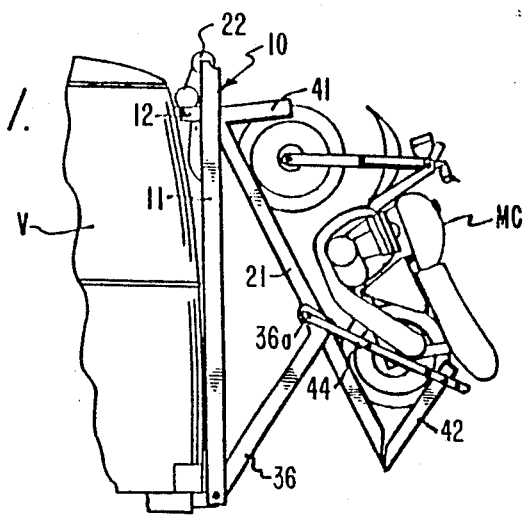
FIG. 1.
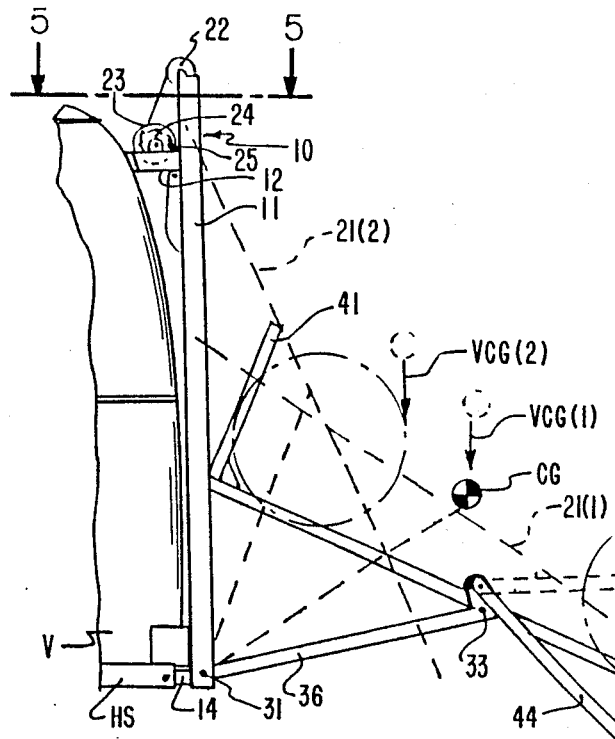
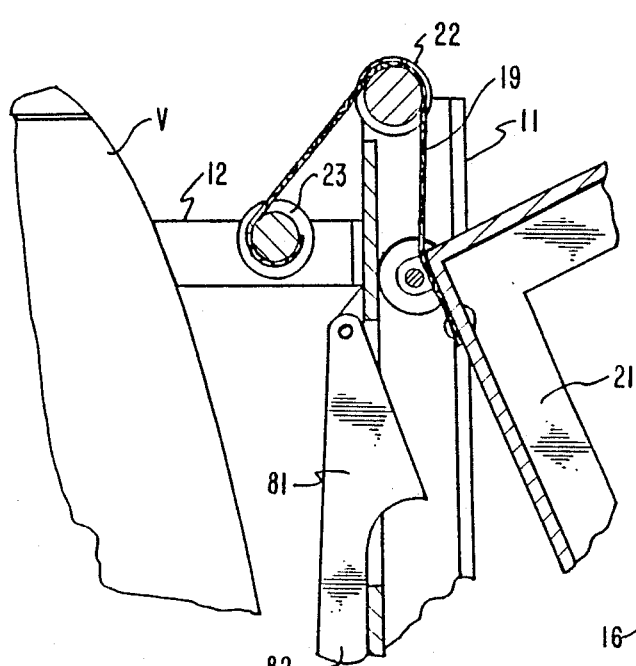
FIG. 4.
FIG. 7.
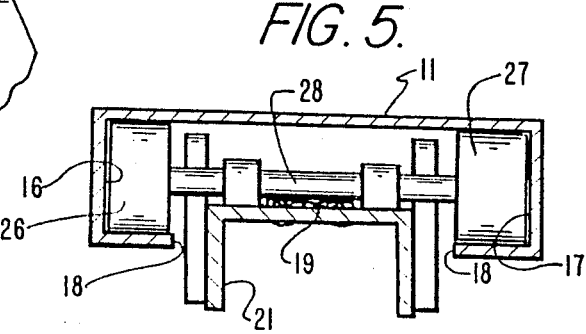
FIG. 5.

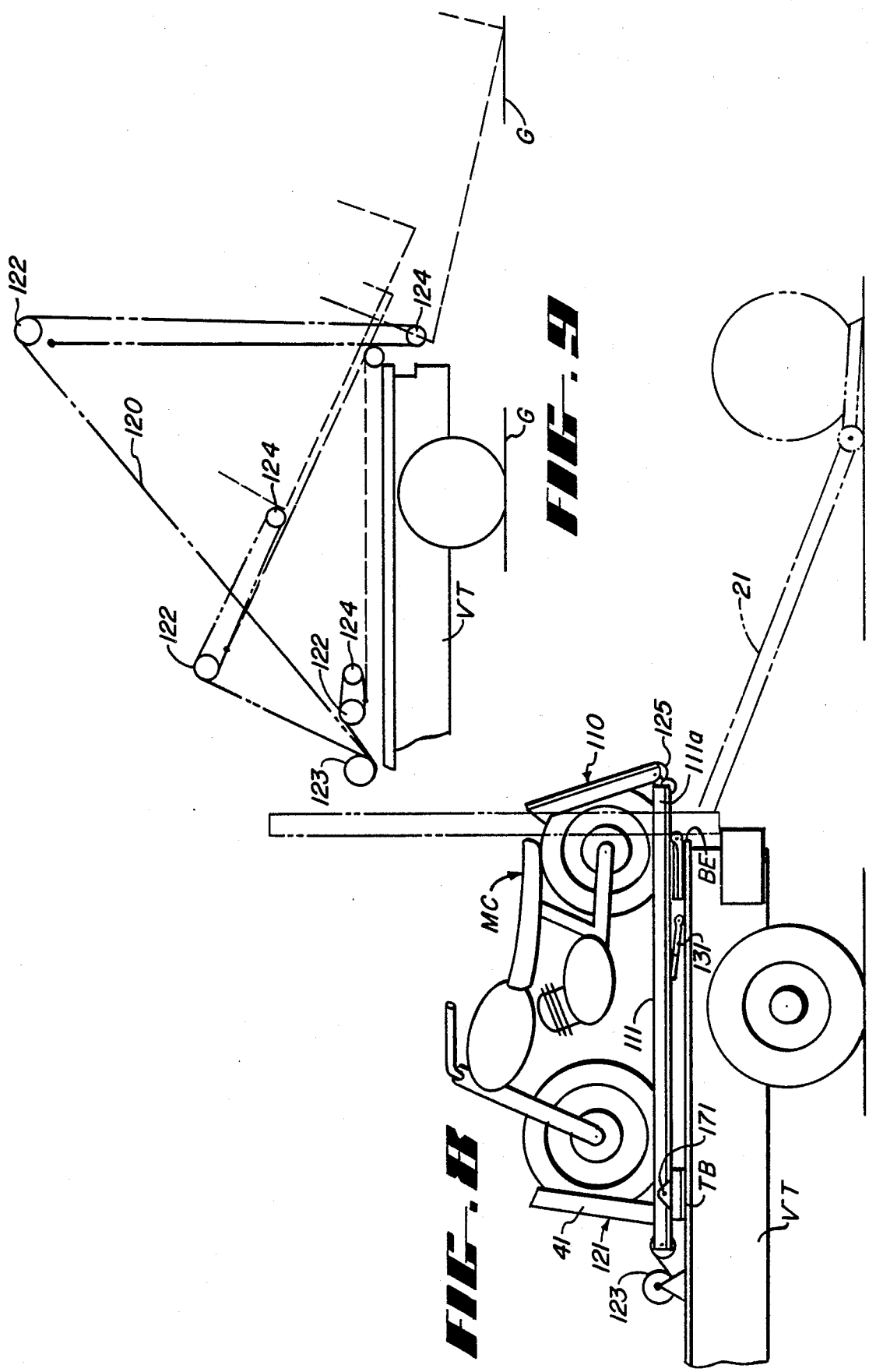

ARTICULATED MOTORCYCLE CARRIER

CROSS-REFERENCE TO RELATED APPLICATION

This application is a continuation-in-part of my U.S. Pat. No. 4,790,713 issued Dec. 13, 1988 titled "Articulated Motorcycle Carrier".

BACKGROUND OF THE INVENTION

1. Field of the Invention

The present invention relates to motorcycle carriers and more particularly to carriers for lifting and storing motorcycles on a truck bed.

2. Description of the Prior Art

Attachments for carrying motorcycles at the rear of a vehicle have been known in the past. In typical practice such carriers store the motorcycle across the rear of the vehicle and thus are limited by width to one motorcycle. Motorcycles, however, are characterized by light weight, narrow cross-section and a lower center of mass relative to their wheel base and a transverse alignment is thus not favorable for optimal storage. Simply, this manner of storage aligns the largest profile of the motorcycle over the vehicle storage surface, thus limiting the number of motorcycles stored.

In today's marketplace large recreational vehicles, trucks, and vans are frequently used to carry motorcycles to the intended destination. Vehicles of this kind are characterized either by a flat bed surface or by a large rear vertical surface, a surface which can conveniently accomodate more than one motorcycle in vertical alignment. Moreover, these vehicles are characteristically conformed for heavy load capability and thus tolerate well this added weight.

Accordingly, techniques for lifting and storing motorcycles in vertical alignment have been sought in the past and it is one such technique that is disclosed herein.

SUMMARY OF THE INVENTION

Accordingly, it is the general purpose and object of the present invention to provide an articulated motorcycle carrier which lifts the motorcycle into a vertical storage alignment.

Other objects of the invention are to provide a motorcycle carrier which articulates from deployment as a ramp to a vertical deployment.

Yet further objects of the invention are to provide a motorcycle carrier which is convenient in use and in fabrication.

Briefly, these and other objects are accomplished according to a first example of the present invention by providing a vertical channel member attachable to the rear of the vehicle in which two rollers extending from the end of a track are received. The lower end of the channel member is connected by a pivotal link to a point substantially central on the track and translation of the rollers downwardly along the channel member thus in an inclined orientation of the track. The track can thus be brought down to an inclined alignment towards the ground.

Additionally, the free end of the track may be provided with a hinged extention which can then be pivoted to form a ramp onto which the motorcycle is rolled for mounting on the track. Once in position, the motorcycle can then be clamped between this extension and a forward brace and the forward end of the track can then be lifted along the channel by taking up a flexible connection and thus lifting the motorcycle into a vertical alignment on the back of the vehicle.

In this manner several motorcycles can be stored on the rear of the vehicle each in a structure which conveniently allows for the lifting and descent.

Alternatively, a lifting and storage mechanism is disclosed by which a motorcycle can be lifted onto a truck bed, once again characterized by a C-sectioned channel member engaged to a pivot fixed at the edge of a truck bed to extend a portion thereof (less than half its length) beyond the bed edge. This projecting segment or portion then extends downwardly below the bed surface when the channel member is pivoted to a vertical alignment. Once again rollers at the forward end of the motorcycle engaging track are received within the channel member, the projecting end of the member being provided with a further roller for rolling translation of the track.

A spring-loaded support is then fixed to the truck bed adjacent the pivot. This support releases once the channel member is raised and in this released state opposes the downward pivotal articulation of the member. As the track is advanced along the member its forward edge trips the support, allowing the member to pivot onto the bed. As previously summarized, a cable or belt pulley arrangement is looped around the end of the member and the track and as the belt is taken in the foregoing advance is effected.

In both the foregoing arrangements the length of the channel member, the track and the other linkages are selected to place the motorcycle center of mass at correct, self-effecting, locations. Thus, in the course of lifting a point is reached at which the motorcycle mass becomes useful in assisting the lifting process and as the motorcycle height increases less force is needed for lifting. Thus, a manual crank may be used to lift the motorcycle without extensive force multiplying mechanisms.

BRIEF DESCRIPTION OF THE DRAWINGS

FIG. 1 is a side view of the inventive carrier in the course of articulation thereof;

FIG. 4 is a further view of the inventive carrier illustrating the moment shift in the course of articulation thereof;

FIG. 5 is a sectional top view taken along line 5—5 of FIG. 4;

FIG. 7 is a sectional side view detail of the rolling engagement useful with the invention herein;

FIG. 8 is yet another side view of an alternative inventive carrier useful with a truck bed;

FIG. 9 is a diagrammatic illustration of the truck bed carrier shown in FIG. 8 in the course of its articulation;

DESCRIPTION OF THE PREFERRED EMBODIMENT

Figure 2:
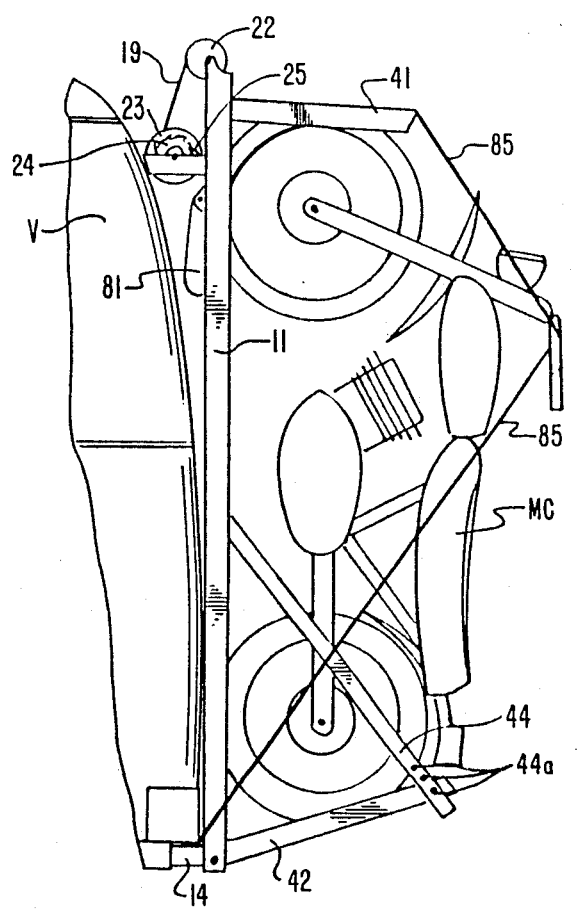
FIG. 2 is yet another side view of the inventive carrier in its erected state.
Figure 3:
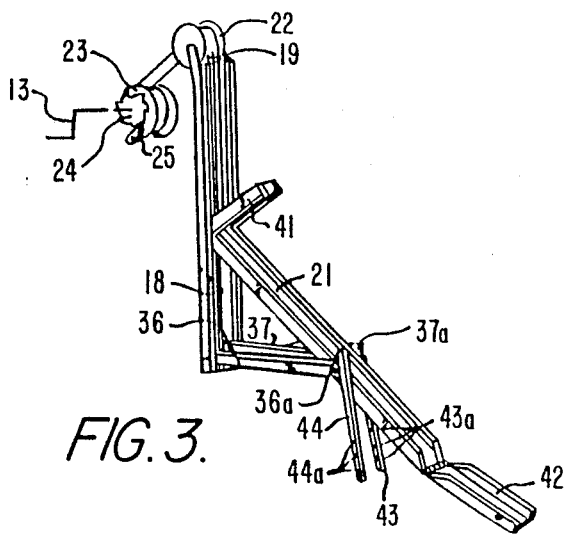
FIG. 3 is a perspective illustration of the inventive carrier deployed for mounting.
Figure 6:
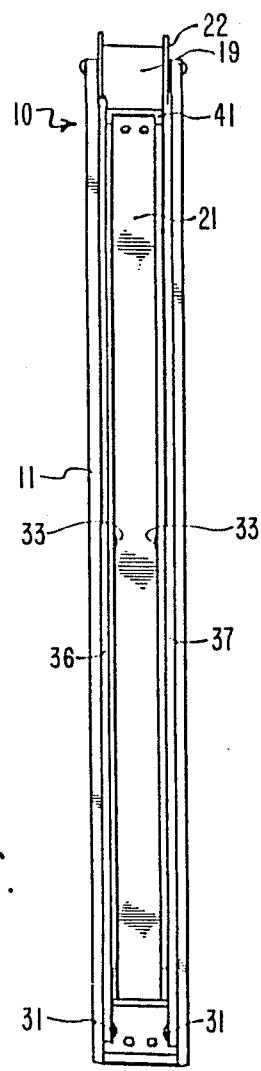
FIG. 6 is a front view of the inventive carrier in its fully raised state.

As shown in FIGS. 1 through 7, one example of the inventive carrier, generally designated by the numeral 10, comprises an elongate channel member 11 conformed for attachment to the upper rear surface of a vehicle V by way of a bracket 12 at the top thereof. At the bottom end channel member 11 attaches to a rectangular insert 14 which is conformed for receipt in the trailer hitch stock HS commonly found on a vehicle.

In this manner the vertical loads imposed on the channel member are transferred to the frame of the vehicle while the transverse loads are carried to the vehicle surface by the bracket 12. The channel member is thus restrained against all modes of loading that may be imposed thereon.

For the purposes herein channel member 11 is formed as a C-section and thus includes two oppositely aligned, longitudinal recesses or grooves 16 and 17 defining an outer opening or slot 18 in the exterior surface thereof. These grooves 16 and 17 then receive two axially aligned rollers 26 and 27 mounted on a common shaft 28 attached to the upper end of a U-sectioned track 21. This end of the track 21, moreover, is fixed to one end of a flexible strap 19 extending over a turning roller 22 fixed to the upper end of the channel member 11. From the turning roller 22 the strap then passes to a take up reel 23 fixed for rotation in bracket 12 and provided with a ratchet wheel 24 engaging a pawl 25. A crank handle 13 is then useful in advancing the reel 23.

Thus, the rotary advancement of reel 23 will take up the strap thereon, raising and lowering the end of the track along th length of the channel member. The track itself is dimensioned to fit within the gap of the slot 18 including spacing accomodations for a pair of pivotal links 36 and 37 extending from a pivot 31 at the lower end of member 11 to a pivot connection 33 proximate to the middle of the track. Links 36 and 37 are dimensioned to lie along the track within the confines of slot 18 when the rollers 26 and 27 are advanced upwardly to the full extent of the allowable travel and to scissor outwardly with a concurrent outward deployment within the opposed grooves 16 and 17.

Thus the downward advancement of the rollers concurrently deploys the track 21 to an inclined alignment with the bottom end thereof being advanced towards the ground. The track is therefore deployable to an alignment allowing the mounting thereon of a wheeled article like a motorcycle MC.

To secure the motorcycle MC in the course of transport the upper or forward end of the track 21 is attached to a cantilevered track segment 41 and the lower end of the track is pivotally engaged to a pivotal extension 42. When deployed for mounting the pivotal extension can be aligned to form a ramp and once the motorcycle MC is rolled into position with one wheel thereof placed in the knee between track 21 and segment 41 the extension 42 may be pivoted to engage the other wheel. In this alignment two releasable straps 43 and 44 may be stretched from the free end of the pivoted extension 42 to engage bellcranks 36a and 37a extending from the ends of links 36 and 37. Thus, the scissoring motion of the links in the course of the upward advancement of the rollers will concurrently tension the straps, securing the motorcycle MC for transport.

Of course straps 43 and 44 may include several points of attachment 43a and 44a to accomodate various motorcycle configurations and the reel 23 may be driven by an electric motor selectively connected by a switch to the battery of the vehicle V. (Not shown.)

Those skilled in the art will appreciate that a typical motorcycle MC is characterized by a center of gravity substantially in the middle of its wheel base displaced above the tire foot print plane. This center of gravity, CG, when the motorcycle MC is mounted on the track is slightly ahead (upwardly) of the link print.

Accordingly, as illustrated in FIG. 4, the initial weight bias on the track 21 is ahead of the pivot connection 33 loading the strap in tension when advanced to the alignment 21(1). At this point the weight bias vector VCG(1) is exactly through the pivot connection and there is, therefore, no moment to oppose at the strap. As the roller end of track 21 is then lifted beyond this point, to the alignment 21(2), then the weight bias VCG(2) is outside the link pivot connection 33 thus advancing the motorcycle upwardly by its own weight to its carried state. The weight of the motorcycle is thus useful to effect lifting which is opposed only by the bellcrank geometry of bellcranks 36a and 36b.

Once the motorcycle MC is thus lifted to the position illustrated in FIG. 1 the further geometric gain may be insuficient to oppose the weight moment obtained from the bellcranks. Accordingly, member 11 is provided with a weight pawl 81 extending into grooves 16 and 17 to oppose the upward travel of rollers 26 and 27. This pawl assembly is located proximate the upper end of channel member 11 at a point where the vector VCG just crosses to the outside the pivotal connection 33. Thus the further upward travel of the rollers is latched in until the user manually releases the pawl 81 by pushing aside a bob weight 82 extending therefrom.

Since the foregoing pawl engagement is close to the neutral weight moment position only small manual forces are required to effect release and further positioning of the track 21 within member 11 is partly opposed by the geometric compression effected by bellcranks 36(a) and 37(a). As a consequence a self effecting mechanism is devised which conveniently raises and stores various motorcycles at the rear of the vehicle V. Of course various securing straps 85 may then be used for retaining the stored motorcycle in place.

Accordingly, two forms of a carrier are thus formed which both allow for convenient loading and for tensioning the motorcycle thereon once articulated to its transport alignment.

Figure 10:
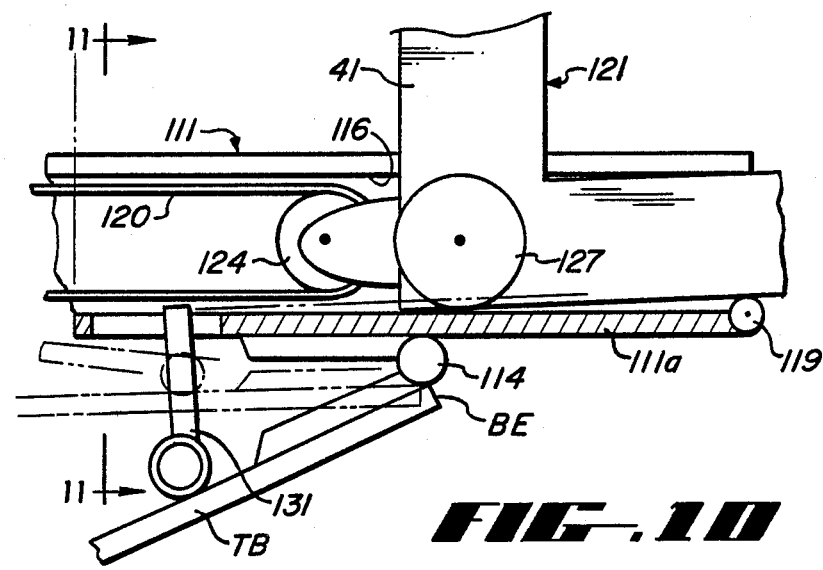
FIG. 10 is a side view detail, in partial section, of a support detent useful with the carrier shown in FIG. 8.
Figure 11:
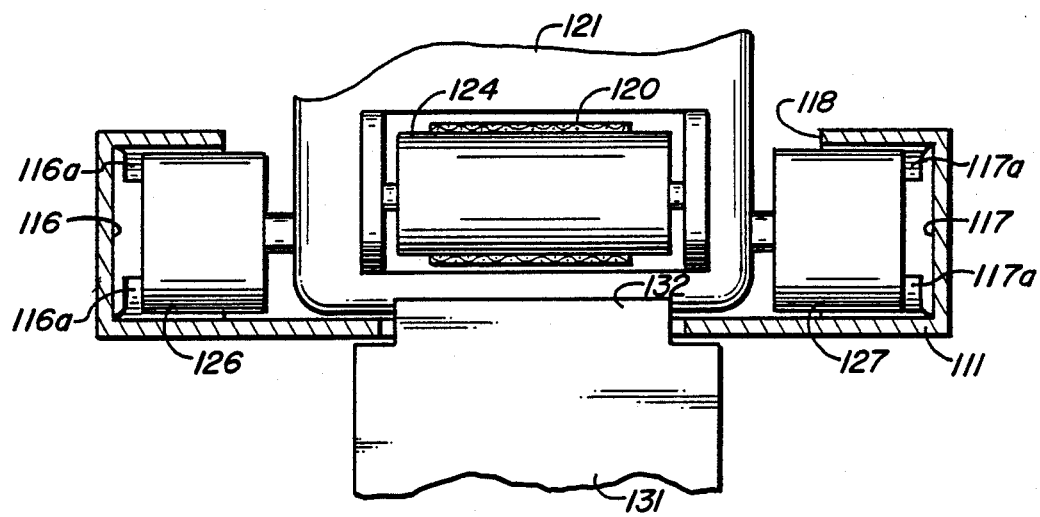
FIG. 11 is a sectional view taken along line 11—11 of FIG. 10.

In the second alternative, shown in FIGS. 8-11, generally designated by the numeral 110, a lifting assembly is provided for use with a flat bed truck or similar vehicle VT. In this example an elongated C-sectioned, channel member 111 is deployed on the truck bed TB to extend a portion thereof 111a beyond the bed edge BE. Channel member 111 is pivotally fixed in this position by a hinge assembly 114 aligned to pivot outside the bed edge BE with the segment 111a being of a dimension selected to clear any subjacent vehicle projections like bumpers or attachments.

Similar to the previously described embodiment, member 111 includes two oppositely aligned recesses or grooves 116 and 117 defining a gap or slot 118 therebetween. Grooves 116 and 117 receive corresponding rollers 126 and 127 at one end of a track 121 which is structured like the track 21 previously described. Reference is therefore made to the above description of track 21 and the attendant cooperative elements thereof. The free end of segment 111a is deformed to close grooves 116 and 117 thus forming a limit 116a and 117a opposing the further progression of the rollers. The span between limits 116a and 117a is provided with a roller pin 119 on which the under side of track 121 is supported in the course of translation.

Thus as track 121 is withdrawn from channel member 111 a point is reached where the weight balance passes the hinge pivot. At this point member 111 is pivoted to an upright position and the rollers 126 and 127 then reach the outer limits of their travel, resting on limits 116a and 117a. In this position track 121 lies at an incline towards ground G and is supported thereat by a set of rear rollers 125. As thus deployed track 121 forms a ramp onto which a motorcycle MC may be loaded and then clamped between the track segment 41 and pivotal extension 42.

Once thus clamped a strap 120 passing from a hand cranked take up reel 123 extends over a guide pulley 122 at the forward end of member 111 to engage a pulley 124 at the segment 41. The strap is then turned over the pulley to its connection proximate pulley 122. As the take up reel 123 is advanced in rotation strap 120 is taken in, advancing rollers 126 and 127 along their grooves and concurrently the tension in the strap tilts member 111 to a pivotal alignment against the edge of a spring loaded pivot stop 131 fixed to the bed TB adjacent the hinge. This angle is maintained until the forward track edge of track 121 abuts a tab 132, displacing the pivot stop 131 against its spring bias. The advancing weight of the track 121 and article thereon then opposes the spring bias until the pivot stop 131 is fully collapsed. At this point member 111 is fully on the truck bed and is secured by pins 171 in this position.

Obviously many modifications and changes may be made to the foregoing description without departing from the spirit of the invention. It is therefore intended that the scope of the invention be determined solely on the claims appended hereto.

What is claimed is:

1. A lifting and storage apparatus useful in lifting and storing articles like motorcycles, onto the bed of a truck, comprising:

an elongate channel member pivotally engaged to the free edge of said truck bed and aligned to deploy a portion thereof in extension beyond said truck bed;

an article carrying track assembly conformed for rolling articulation along said channel member, said track assembly including engagement rollers at one end thereof for rolling engagement with said member;

pulley means engaged between said truck bed, said channel member and said track assembly for concurrent release of pivotal motion of said member and rolling extension of said track assembly along said member, whereby the extension of said track assembly provides a weight bias to said member for pivoting said member to a vertical alignment relative to said truck bed; and a spring-loaded detent mounted to said truck bed and aligned to oppose the pivotal motion of said member, said detent including engagement means aligned for engagement by said track assembly in the course of translation thereof along said member.

2. Apparatus according to claim 1 wherein:
said track assembly includes means for releasably securing said article thereto.

3. Apparatus according to claim 2 wherein:
said channel member includes limits for limiting the translation of said track assembly thereon.

4. Apparatus according to claim 3 wherein:
said pulley means includes a take-up reel having wound thereon a flexible connecting element.

* * * * *